US012718068B2

(12) United States Patent
Cao et al.

(10) Patent No.: US 12,718,068 B2
(45) Date of Patent: Aug. 25, 2026

(54) HARDWARE ENVIRONMENT-BASED DATA OPERATION METHOD, APPARATUS AND DEVICE, AND STORAGE MEDIUM

(71) Applicant: INSPUR SUZHOU INTELLIGENT TECHNOLOGY CO., LTD., Jiangsu (CN)

(72) Inventors: Qichun Cao, Jiangsu (CN); Gang Dong, Jiangsu (CN); Lingyan Liang, Jiangsu (CN); Wenfeng Yin, Jiangsu (CN); Jian Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 695 days.

(21) Appl. No.: 18/247,172

(22) PCT Filed: Jul. 29, 2021

(86) PCT No.: PCT/CN2021/109227
§ 371 (c)(1),
(2) Date: Mar. 29, 2023

(87) PCT Pub. No.: WO2022/110860
PCT Pub. Date: Jun. 2, 2022

(65) Prior Publication Data

US 2023/0409885 A1 Dec. 21, 2023

(30) Foreign Application Priority Data

Nov. 25, 2020 (CN) ......................... 202011342242.0

(51) Int. Cl.
*G06N 3/0464* (2023.01)
*G06F 16/25* (2019.01)
(Continued)

(52) U.S. Cl.
CPC ......... *G06N 3/0464* (2023.01); *G06F 16/258* (2019.01); *G06N 3/045* (2023.01); *G06N 3/063* (2013.01)

(58) Field of Classification Search
CPC .... G06F 16/258; G06N 3/0464; G06N 3/045; G06N 3/063
See application file for complete search history.

(56) References Cited

U.S. PATENT DOCUMENTS 10,528,864 B2 * 1/2020 Dally .................. G06N 3/0495
10,600,147 B2 * 3/2020 Daga ...................... G06T 9/002
(Continued)

FOREIGN PATENT DOCUMENTS

CN 107341761 A 11/2017
CN 108320019 A 7/2018
(Continued)

OTHER PUBLICATIONS

Nazariy K. Shaydyuk and Eugene B. John. "Semi-Streaming Architecture: A New Design Paradigm for CNN Implementation on FPGAs", Jun. 2020, 8 pages. (Year: 2020).*
(Continued)

*Primary Examiner* — G. C. Neurauter, Jr.
(74) *Attorney, Agent, or Firm* — Dennemeyer & Associates LLC

(57) ABSTRACT

A hardware environment-based data operation method, apparatus and device, and a storage medium. The method includes: determining data to be operated and target hardware, wherein the target hardware is a hardware resource that needs to perform convolution computation on the data to be operated currently; determining the maximum number of channels in which the target hardware executes parallel computation, and determining a data layout corresponding to the maximum number of channels to be an optimal data (Continued)

layout; and converting the data layout of the data to be operated into the optimal data layout, and performing the convolution computation on the data to be operated by using the target hardware after the conversion is completed. By means of the present disclosure, the maximum parallel program of a data operation is realized when the convolution computation of the data to be operated is implemented.

18 Claims, 5 Drawing Sheets

(51) Int. Cl.
*G06N 3/045* (2023.01)
*G06N 3/063* (2023.01)

(56) References Cited

U.S. PATENT DOCUMENTS

| | | | | |
|---|---|---|---|---|
| 10,769,526 | B2 * | 9/2020 | Daga | G06N 3/08 |
| 11,550,600 | B2 * | 1/2023 | Xu | G06F 16/215 |
| 12,223,417 | B2 * | 2/2025 | Srivastava | G06N 3/09 |
| 2018/0300600 | A1 * | 10/2018 | Ma | G06N 3/04 |
| 2018/0308208 | A1 * | 10/2018 | Surti | G06N 3/0464 |
| 2021/0142154 | A1 * | 5/2021 | Pang | G06F 3/0604 |

FOREIGN PATENT DOCUMENTS

| | | | | | |
|---|---|---|---|---|---|
| CN | 109656623 | A | | 4/2019 | |
| CN | 109871510 | A | | 6/2019 | |
| CN | 110084739 | A | * | 8/2019 | G06T 1/20 |
| CN | 110543936 | A | | 12/2019 | |
| CN | 111027682 | A | | 4/2020 | |
| CN | 111897579 | A | | 11/2020 | |
| CN | 112488296 | A | | 3/2021 | |
| CN | 108182471 | B | * | 2/2022 | G06N 3/045 |
| CN | 114995823 | B | * | 8/2024 | G06N 3/082 |
| KR | 20190013162 | A | | 2/2019 | |
| WO | 2020038551 | A1 | | 2/2020 | |

OTHER PUBLICATIONS

Long Chung Chan et al. “Partitioning FPGA-Optimized Systolic Arrays for Fun and Profit”, 2019 International Conference on Field-Programmable Technology (ICFPT), 9 pages. (Year: 2019).*
Liqiang Lu et al. “An Efficient Hardware Accelerator for Sparse Convolutional Neural Networks on FPGAs”, 2019 IEEE 27th Annual International Symposium on Field-Programmable Custom Computing Machines (FCCM), 9 pages. (Year: 2019).*
Jichen Wang et al. “Efficient Hardware Architectures for Deep Convolutional Neural Network”, IEEE Transactions on Circuits and Systems—I: Regular Papers, vol. 65, No. 6, Jun. 2018, 13 pages. (Year: 2018).*
Yali Shi et al. “Design of Parallel Acceleration Method of Convolutional Neural Network Based on FPGA”, 2020 IEEE 5th International Conference on Cloud Computing and Big Data Analytics, Apr. 2020, 5 pages. (Year: 2020).*
Afzal Ahmad and Muhammad Adeel Pasha. “Optimizing Hardware Accelerated General Matrix-Matrix Multiplication for CNNs on FPGAs”, IEEE Transactions on Circuits and Systems—II: Express Briefs, vol. 67, No. 11, Nov. 2020, 5 pages. (Year: 2020).*
Search report for PCT/CN2021/109227 mailed on Nov. 3, 2021.
Search report for Chinese application 202011342242.0, filed Nov. 25, 2020.

* cited by examiner

Weight1
Data
Two-dimensional convolution
Activation computation
Maximum pooling
Weight2
Two-dimensional convolution
Residual
Weight2
Full-connection
Excitation function Operation
Input data
Operation direction Filter re-ranking Feature map re-ranking

First determination module
Second determination module
Operation module

HARDWARE ENVIRONMENT-BASED DATA OPERATION METHOD, APPARATUS AND DEVICE, AND STORAGE MEDIUM

CROSS-REFERENCE TO RELATED APPLICATION

This is a 35 U.S.C. 371 National Stage Patent Application of International Application No. PCT/CN2021/109227, filed Jul. 29, 2021, which claims priority to Chinese application 202011342242.0, filed Nov. 25, 2020, each of which is hereby incorporated by reference in its entirety.

TECHNICAL FIELD

The present disclosure relates to the technical field of artificial intelligence, and in particular to a hardware environment-based data operation method, apparatus and device, and a storage medium.

BACKGROUND

The development of artificial intelligence in various fields is rapid, and as one of the most important representatives of artificial intelligence, CNNs (Convolutional Neural Networks) have numerous breakthrough advances in the field of image analysis and processing, and are widely applied to various types of image-related applications. In the prior art, a trained CNN model is directly deployed on an existing computation platform for a prediction operation in general, and how to improve the execution efficiency of the CNN in this manner becomes an urgent problem to be solved by those skilled in the art.

SUMMARY

The purpose of the present disclosure is to provide a hardware environment-based data operation method, apparatus and device, and a storage medium, which may effectively improve the execution efficiency of a CNN by means of improving the efficiency of convolution computation.

In order to realize the above objective, the present disclosure provides the following technical solutions:

A hardware environment-based data operation method, the method includes:

determining data to be operated and target hardware, wherein the target hardware is a hardware resource that needs to perform convolution computation on the data to be operated currently;

determining the maximum number of channels in which the target hardware executes parallel computation, and determining a data layout corresponding to the maximum number of channels to be an optimal data layout; and converting the data layout of the data to be operated into the optimal data layout, and performing the convolution computation on the data to be operated by using the target hardware after the conversion is completed.

In an embodiment, performing the convolution computation on the data to be operated by using the target hardware includes:

acquiring a plurality of kernel parameters, and sequentially performing the convolution computation on the data to be operated and each kernel parameter by using the target hardware; and the method further includes:

while performing the convolution computation on other kernel parameters except the first kernel parameter and the data to be operated by using the target hardware, performing preset channel-irrelevant computation on a convolution computation result corresponding to the previous kernel parameter on which the convolution computation is performed.

In an embodiment, sequentially performing the convolution computation and the preset computation on the data to be operated with any kernel parameter includes:

sequentially performing the convolution computation and the preset computation on the data to be operated with any kernel parameter according to a preset operator, and storing a result obtained after performing the preset computation, wherein the preset operator is obtained by fusing an operator of the convolution computation with an operator of the preset computation.

In an embodiment, before performing the convolution computation and the preset computation on the data to be operated, the method further includes:

predicting storage spaces respectively required by tensor data and constant data, which need to be stored during the process of operating the data to be operated, and allocating memories of the corresponding storage spaces to the data to be operated, so as to realize corresponding data storage, wherein the operation includes the convolution computation and the preset computation.

In an embodiment, allocating memories of the corresponding storage spaces to the data to be operated includes:

for a plurality of kernel parameters required for performing the convolution computation on the data to be operated, allocating the memories with continuous addresses of the corresponding storage spaces, so as to realize the storage of each kernel parameter.

In an embodiment, performing the convolution computation and the preset computation on the data to be operated includes:

implementing the convolution computation and the preset computation on the data to be operated by means of scheduling threads respectively corresponding to each operation.

In an embodiment, the method further includes:

after each operation on the data to be operated is completed, setting a corresponding flag bit in a specified register, so as to determine, on the basis of the flag bit, an operation that needs to be performed on the data to be operated.

A hardware environment-based data operation apparatus, the apparatus includes:

a first determination module, configured to determine data to be operated and target hardware, wherein the target hardware is a hardware resource that needs to perform convolution computation on the data to be operated currently;

a second determination module, configured to determine the maximum number of channels in which the target hardware executes parallel computation, and determine a data layout corresponding to the maximum number of channels to be an optimal data layout; and an operation module, configured to convert the data layout of the data to be operated into the optimal data layout, and perform the convolution computation on the data to be operated by using the target hardware after the conversion is completed.

A hardware environment-based data operation device, the device includes:

a memory, configured to store a computer program; and at least one processor, configured to implement the operations of any one of the foregoing hardware environment-based data operation method when executing the computer program.

A computer-readable storage medium, wherein a computer program is stored on the computer-readable storage medium, and when executed by at least one processor, the computer program implements the operations of any one of the foregoing hardware environment-based data operation method.

The present disclosure provides a hardware environment-based data operation method, apparatus and device, and a storage medium. The method includes: determining data to be operated and target hardware, wherein the target hardware is a hardware resource that needs to perform convolution computation on the data to be operated currently; determining the maximum number of channels in which the target hardware executes parallel computation, and determining a data layout corresponding to the maximum number of channels to be an optimal data layout; and converting the data layout of the data to be operated into the optimal data layout, and performing the convolution computation on the data to be operated by using the target hardware after the conversion is completed. In the present disclosure, after the hardware, which needs to implement the convolution computation on the data to be operated, is determined, the data to be operated is converted into the data layout of the maximum number of channels in which the target hardware executes parallel computation, the convolution computation is performed on the data to be operated in the data layout by using the hardware, therefore parallel operation resources provided by the hardware may be fully utilized, thereby reaching the maximum parallel operation of a data operation when the convolution computation of the data to be operated is implemented, and effectively improving the efficiency of the convolution computation; and as the convolution computation occupies nearly 90% of the computation time of a CNN, the present disclosure may effectively improve the execution efficiency of the CNN by means of improving the efficiency of the convolution computation.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely embodiments of the present disclosure, based on which other drawings may be obtained by those ordinary skilled in the art without any creative effort.

FIG. 9 is a schematic structural diagram of a hardware environment-based data operation apparatus provided in an embodiment of the present disclosure.

DETAILED DESCRIPTION OF THE EMBODIMENTS

A clear and complete description of technical solutions in the embodiments of the present disclosure will be given below in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

Figures 1, 2:
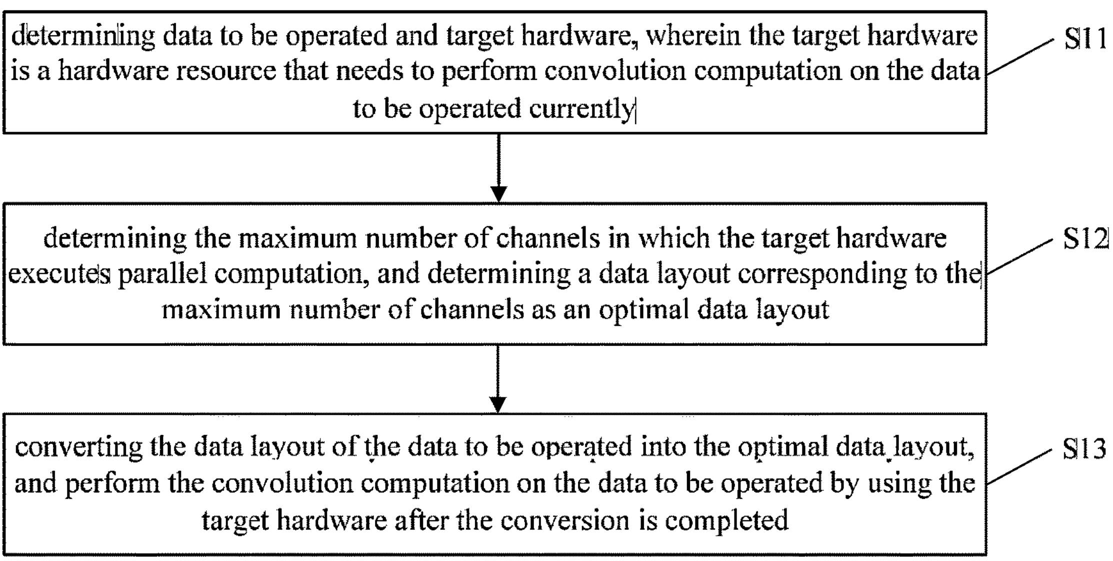
FIG. 1 is a flowchart of a hardware environment-based data operation method provided in an embodiment of the present disclosure.
FIG. 2 is an example computation graph of a double-layer convolutional neural network in a hardware environment-based data operation method provided in an embodiment of the present disclosure.

Please refer to FIG. 1, it shows a flowchart of a hardware environment-based data operation method provided in an embodiment of the present disclosure. The method may include:

S11: determining data to be operated and target hardware, wherein the target hardware is a hardware resource that needs to perform convolution computation on the data to be operated currently.

The execution body of the hardware environment-based data operation method provided in the embodiment of the present disclosure may be a corresponding data operation apparatus. The data to be operated may refer to data that is not subjected to any convolution computation and thus requires convolution computation, and may also refer to data that is subjected to corresponding convolution computation and requires the convolution computation again, which are all within the protection scope of the present disclosure.

It should be noted that, the present disclosure may improve the performance of a CNN design on the basis of various accelerators, which are designed by an FPGA (Field-Programmable Gate Array), a GPU (Graphics Processing Unit), or even an ASIC (Application Specific Integrated Circuit), and in an embodiment, the CNN is implemented on the basis of the FPGA.

S12: determining the maximum number of channels in which the target hardware executes parallel computation, and determining a data layout corresponding to the maximum number of channels to be an optimal data layout.

The computation graph is a common method for representing a program in a deep learning framework, as shown in FIG. 2, it shows an example computation graph expression of a double-layer convolutional neural network. The computation graph may provide a global view of an operator, which may be converted into a functionally equivalent graph for application optimization, and may also optimize a fixed input shape by using the shape specificity in a common deep learning workload; when the computation graph expression is used for application optimization, nodes represent operations on tensors or program inputs, and edges represent the data dependency between the operations.

A plurality of methods are available to store a given tensor in the computation graph, the most common data layout choice is columns and rows, and of course, more complex data layouts may also be used; and the data layout optimization converts the data to be operated into a better internal data layout diagram, which may be executed on the target hardware. In an embodiment, it is determined that the maximum number of channels in which the target hardware may execute parallel computation when implementing the convolution computation, and the more sufficient hardware resources are used during the convolution computation, the higher the degree of parallelism is, the higher the efficiency of implementing the convolution computation is, therefore, it may be determined that the data layout corresponding to the maximum number of channels in which the target hardware may execute parallel computation is the data layout required when the convolution computation is performed on the data to be operated by using the target hardware, which may enable the highest efficiency when the convolution computation is performed by using the target hardware.

S13: converting the data layout of the data to be operated into the optimal data layout, and performing the convolution computation on the data to be operated by using the target hardware after the conversion is completed.

After the maximum number of channels in which the target hardware may execute parallel computation when performing the convolution computation is determined, the data layout of the data to be operated is converted into the data layout corresponding to the maximum number of channels, and then the convolution computation is performed on the data to be operated by using the target hardware, so that when the target hardware performs the convolution computation on the data to be operated, the convolution computation of the data to be operated is implemented by the data layout of the maximum number of channels in which the target hardware may execute parallel computation, therefore the hardware resources of the target hardware may be fully utilized. In an implementation, the target hardware may be an FPGA-based VU37P board card, and the VU37P may execute 64-channel parallel computation, so that the data to be operated is converted into data having a 64-channel data layout according to the hardware resources of the target hardware, and then the convolution computation is implemented thereon. In the implementation, the data to be operated is Featuremap (feature map) data, Featuremap data is split into channel/64 blocks, the data dimension is [channel/64][height] [width] [64], Weight data is split into outputchannel/64 block, and the data dimension is [outputchannel/64][inputchannel][height][width][64], for example, as shown in FIG. 3, Featuremap[1, height, width, 64], Weight [4, 64, height, width, 64].

In addition, in the present disclosure, before the data layout of the data to be operated is converted into the optimal data layout, it may also be determined whether a preferred data layout of a software end matches the optimal data layout, if so, there is no need to convert the data layout of the data to be operated, and otherwise, the data layout of the data to be operated needs to be converted into the optimal data layout, wherein the preferred data layout of the software end is specified for each operator (including an operator of the convolution computation) according to constraints specified by a memory hierarchical structure.

In the present disclosure, after the hardware, which needs to implement the convolution computation on the data to be operated, is determined, the data to be operated is converted into the data layout of the maximum number of channels in which the hardware may execute parallel computation, the convolution computation is performed on the data to be operated in the data layout by using the hardware, therefore parallel operation resources provided by the hardware may be fully utilized, thereby reaching the maximum parallel operation of a data operation when the convolution computation of the data to be operated is implemented, and effectively improving the efficiency of the convolution computation; and as the convolution computation occupies nearly 90% of the computation time of a CNN, the present disclosure may effectively improve the execution efficiency of the CNN by means of improving the efficiency of the convolution computation.

Figures 3, 4:
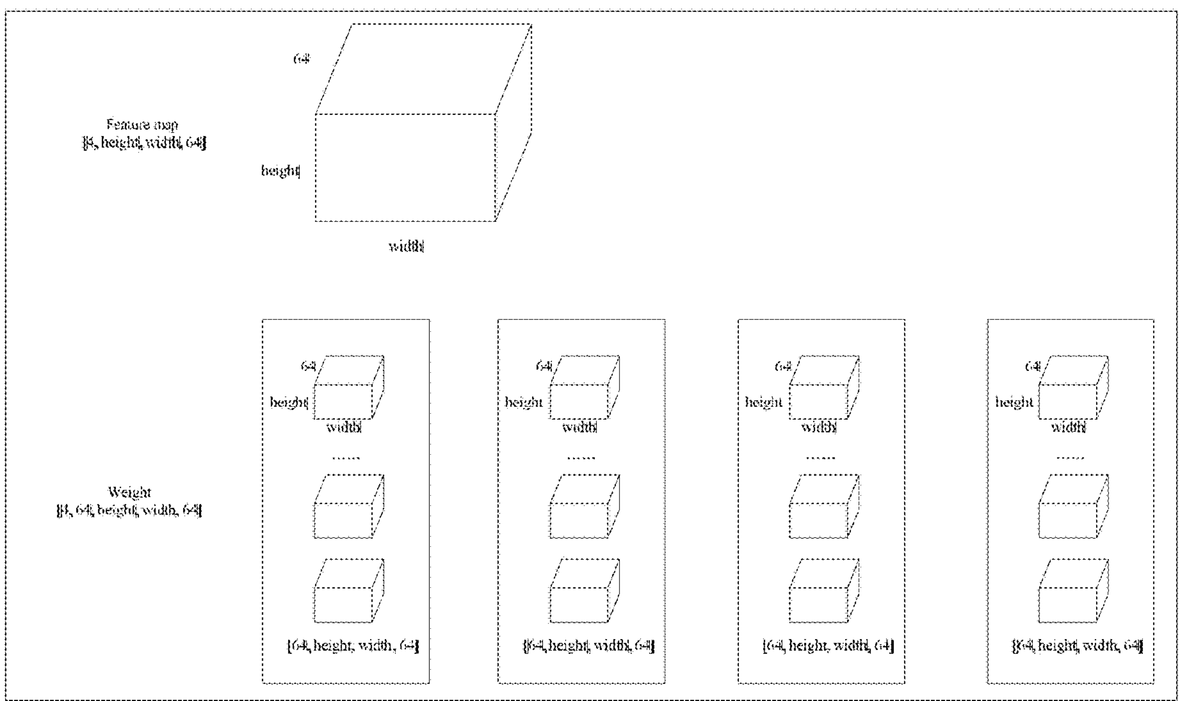
FIG. 3 is an example diagram of Featuremap data splitting in a hardware environment-based data operation method provided in an embodiment of the present disclosure.
FIG. 4 is a schematic diagram of a DSP array in a hardware environment-based data operation method provided in an embodiment of the present disclosure.

It should be noted that, for a parallelized hardware environment, for example, the FPGA-based VU37P board card, a convolution array module for implementing the convolution computation mainly refers to the idea of a TPU (Tensor Processing Unit) systolic array, a DSP (Digital Signal Processor) is used to construct an array (which may be referred to as a DSP array), the convolution computation may be quickly performed, a 5-layer structure is used inside the DSP array, an array composed of 9×8×9×8=5184 DSPs is constructed, and as shown in FIG. 4, maximum 64-channel parallel computation may be formed.

In addition, the convolutional neural network is a feed-forward neural network, which includes the convolution computation and has a depth structure, and is one of representative algorithms of deep learning. The convolutional neural network has a representation learning capability, and may perform shift-invariant classification on input data according to a hierarchical structure thereof, and thus is also referred to as a "shift-invariant artificial neural network (SIANN)". A complete convolutional neural network (CNN) may include at least one convolution layer, at least one pooling layer, at least one full-connection layer, and the like, wherein the convolution layer is used for performing feature extraction, the pooling layer is used for reducing dimensions, and the full-connection layer may be used for performing result prediction (a full-convolutional network may also be used for performing result prediction). The kernel of the convolution layer is the convolution computation, and the convolution computation occupies nearly 90% of the computation time of the CNN, therefore the network performance of the CNN may be effectively improved by optimizing the convolution computation in the network forward computation of the CNN.

According to the hardware environment-based data operation method provided in the embodiment of the present disclosure, the step of performing the convolution computation on the data to be operated by using the target hardware may include:

acquiring a plurality of kernel parameters, and sequentially performing the convolution computation on the data to be operated and each kernel parameter by using the target hardware; and the hardware environment-based data operation method may further include:

while performing the convolution computation on other kernel parameters except the first kernel parameter and the data to be operated by using the target hardware, performing preset channel-irrelevant computation on a convolution computation result corresponding to the previous kernel parameter on which the convolution computation is performed.

Figures 5, 6:
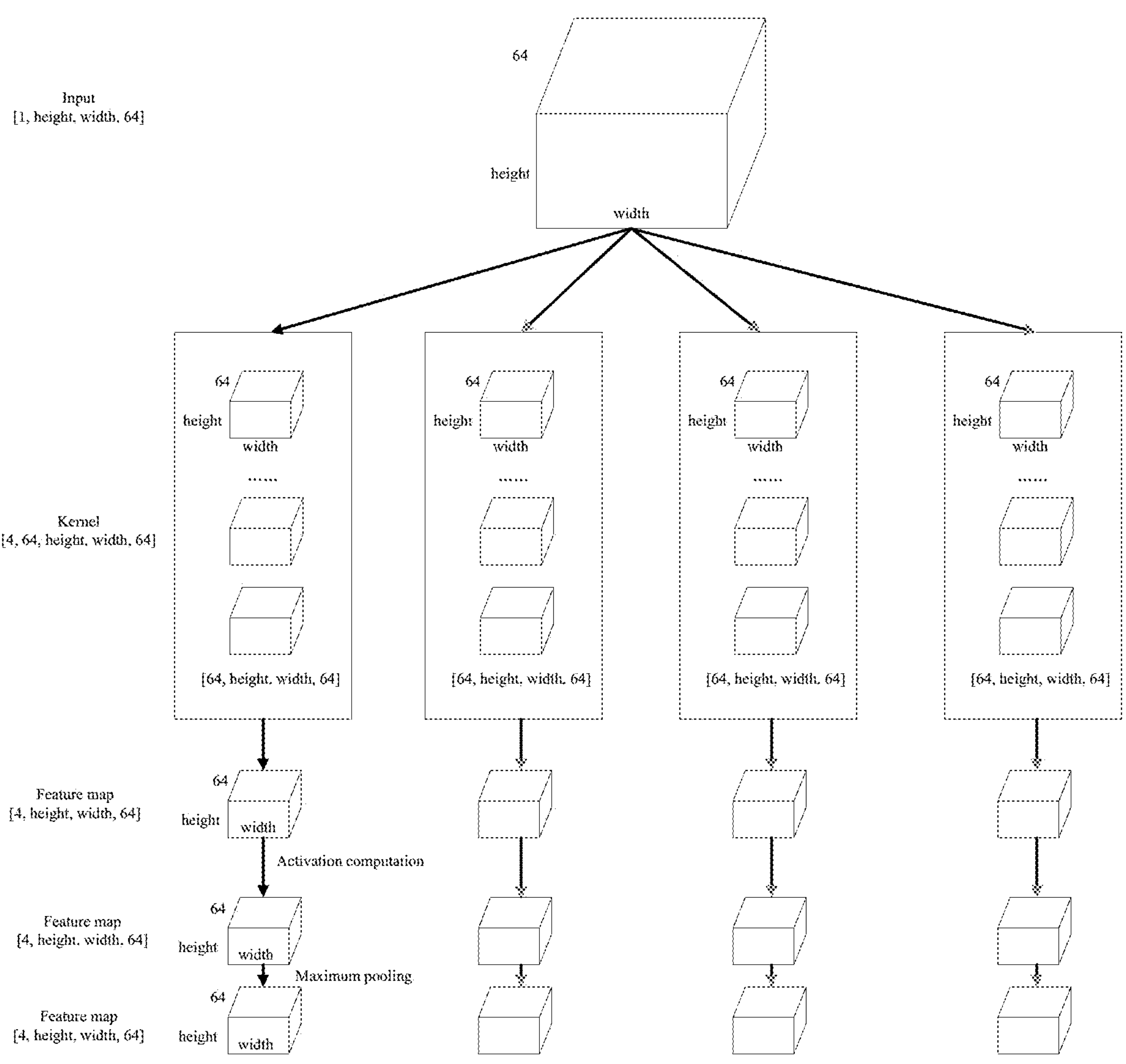
FIG. 5 is an example diagram of a multi-path parallel convolution computation process in a hardware environment-based data operation method provided in an embodiment of the present disclosure.
FIG. 6 is an example diagram of respectively performing convolution computation on data to be operated and a plurality of kernel parameters in a hardware environment-based data operation method provided in an embodiment of the present disclosure.

It should be noted that, during the process of performing corresponding CNN operations on the data to be operated, since the operations implemented on the data to be operated include channel-relevant operations (such as convolution computation and sampling) and channel-irrelevant operations (such as activation, pooling and residual, which may all be used as preset computation), in order to further improve the network performance of the CNN, the present disclosure may divide the operation of the data to be operated into multiple paths of parallel implementations. In an embodiment, a plurality of kernel parameters for implementing the convolution computation may be acquired, the convolution computation is respectively performed on the data to be operated by using each kernel parameter, and after the convolution computation of any kernel parameter and the data to be operated is completed, the data after the convolution computation may directly participate in operations such as activation, pooling and residual, and meanwhile, the convolution computation is performed on the data to be operated by using the next kernel parameter, until the CNN operations of all kernel parameters with each of the plurality of acquired kernel parameters are completed respectively. This manner may also be understood as splitting an output channel, so as to split the data to be operated into several blocks, and when each block is operated, the operation of other blocks is not affected. In addition, an example of the multi-path parallel convolution computation process may be shown in FIG. 5, wherein the convolution computation may be split into two paths of parallel computation, the data after the first path of computation is completed may directly participate in operations such as activation and pooling, and meanwhile, the second path of data is calculated by a convolution systolic array, such that the operation time of operations such as activation and pooling may be saved, and the computation resources of the convolution systolic array are applied to the greatest extent; and an example diagram of respectively performing the convolution computation on the data to be operated and the plurality of kernel parameters in the multi-path parallel convolution computation may be shown in FIG. 6, which may include:

(1) Input data (i.e., the data to be operated) with a dimension of [1, height, width, 64], and kernel data (i.e., kernel parameter) with a dimension of [4, 64, height, width, 64], the kernel data is split into four blocks, that is, ①, ②, ③ and ④, and the convolution computation is performed on the input data and the data ①, so as to obtain a data block of an output channel 64.

(2) A relu+maxpool operation is performed on featuremap, which is obtained after the convolution computation is performed on the input data and the data ①, and meanwhile, the convolution computation is performed on the input data and the data ②.

(3) Repetition is performed in this way, after the convolution computation is performed on the input data and the data ④ to obtain the output featuremap, the featuremap of the data ①, ② and ③ may be sent into the convolution systolic array in sequence, so as to perform the next convolution computation without waiting for the completion of the relu+maxpool operation of the data ④, therefore the time difference during the operation of the data ①, ② and ③ is fully utilized to realize a pipelined operation of the convolution computation in the convolution systolic array.

According to the hardware environment-based data operation method provided in the embodiment of the present disclosure, the step of sequentially performing the convolution computation and the preset computation on the data to be operated with any kernel parameter may include:

sequentially performing the convolution computation and the preset computation on the data to be operated with any kernel parameter according to a preset operator, and storing a result obtained after performing the preset computation, wherein the preset operator is obtained by fusing an operator of the convolution computation with an operator of the preset computation.

In the present disclosure, a plurality of operators may be fused into one operator, or a plurality of operators are combined into one kernel, therefore after the result of the operator obtained by fusion is realized, the result is then stored, different from storing the result of each operator, the execution time may be greatly shortened, and especially in a GPU and a special accelerator. As mentioned in the above-mentioned embodiments, the computation graph of the CNN generally includes two types of graph operators (which are referred to as operators), which are respectively channel-irrelevant operators (such as activation, pooling and residual) and channel-relevant operators (such as convolution and sampling). In the embodiment of the present disclosure, the channel-irrelevant operators may be fused into the channel-relevant operators according to a certain rule, therefore the operators of the convolution computation are the channel-relevant operators, the channel-irrelevant operators, such as activation, pooling and residual, may be fused into the output thereof during the output process thereof, so that a plurality of operators are fused during computation, thereby reducing the memory access and improving the working efficiency.

Figure 7:
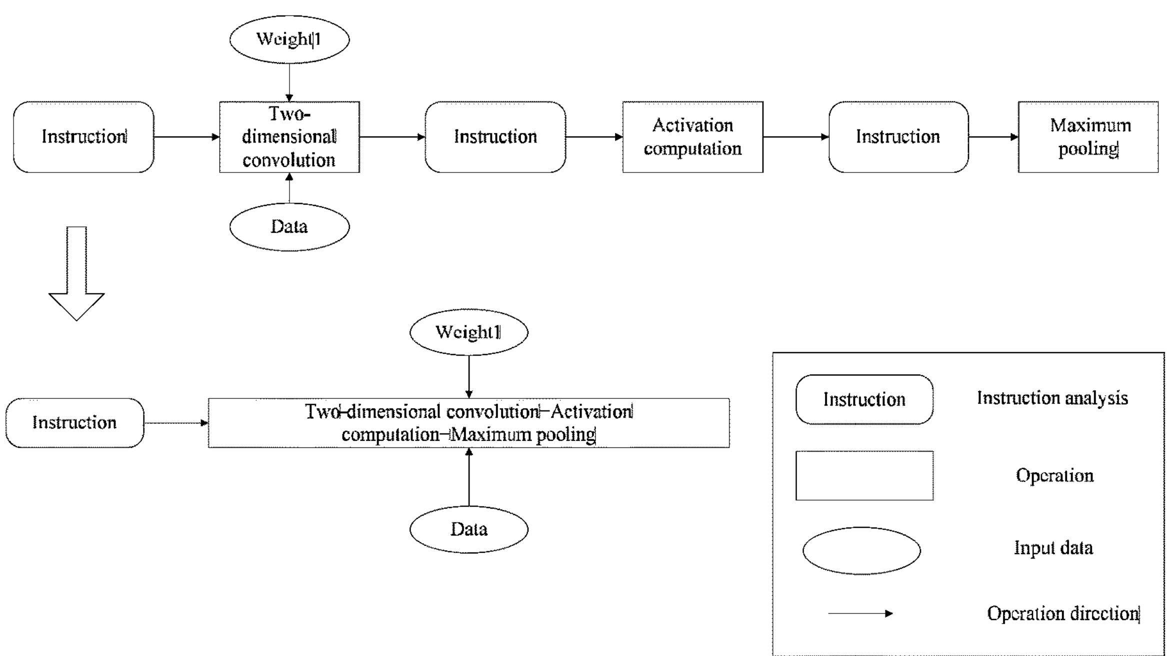
FIG. 7 is an example diagram of operator fusion in a hardware environment-based data operation method provided in an embodiment of the present disclosure.

FIG. 7 is an example diagram of operator fusion, wherein when instruction scheduling is performed on a hardware end, the convolution computation is executed after a convolution instruction is parsed, a result obtained after the operation is completed is stored in a memory, and then the next instruction is parsed to execute an activation operation. Since the convolution computation is channel-relevant, and the activation and pooling are channel-irrelevant, after one output channel is completed by the convolution computation, the activation and pooling may be directly operated without affecting the data of other output channels of the convolution computation, so that the computation time becomes Conv2d+relu+maxpool=conv2d, conv2d+relu+eltwise_add=conv2d, Conv2d refers to two-dimensional convolution, relu refers to activation computation, maxpool refers to maximum pooling, and eltwise_add refers to residual addition. Therefore, the operation time of instruction analysis, memory access, and activation or pooling or residual is reduced. In the embodiment of the present disclosure, during design, the data of the convolution systolic array is made into a cyclic pipelined operation, so that the next convolution computation is performed immediately after the computation is completed, thereby maximally utilizing the convolution systolic array, and thus fully utilizing the resources. In one example, the activation and maximum pooling may be fused on the computation (i.e., the operators thereof are fused with the operator of the convolution computation), for example, the kernel of the maxpool is 2, and when the maximum value of a 2×2 area is found, an initial value is set to be 0, that is, X0=0, then:

| X1 | X2 |
| --- | --- |
| X3 | X4 |

If X1>X0,

X0=X1,

If X2>X0,

X0=X2,

If X3>X0,

X0=X3,

If X4>X0,

X0=X4.

As described in the above computation process, X0 refers to the maximum value in the 2×2 area, and considering that relu and maxpool are two operators, the two operators are fused into one operator.

According to the hardware environment-based data operation method provided in the embodiment of the present disclosure, before performing the convolution computation and the preset computation on the data to be operated, the method may further include:

predicting storage spaces respectively required by tensor data and constant data, which need to be stored during the process of operating the data to be operated, and allocating memories of the corresponding storage spaces to the data to be operated, so as to realize corresponding data storage, wherein the operation includes the convolution computation and the preset computation.

In the embodiment of the present disclosure, for the tensor data and the constant data, which need to be stored during the process of operating the data to be operated, corresponding storage spaces may be allocated thereto, so as to accelerate the data access speed, thereby improving the efficiency of operating the data to be operated. In an embodiment, the process of operating the data to be operated is a computation graph execution process, the size of the tensor data (which may also be referred to as an intermediate tensor) may be calculated according to the input information or data of each layer of operation, and a corresponding memory is allocated to each piece of tensor data in advance, so as to store the tensor data by using the allocated memory when needed; and in addition, for the constant data (which may also be referred to as constant portion data) in the computation graph, for example, weight kernel data (i.e., kernel data) has been determined during operation reasoning, in order to save computation resources during the operation, before executing the operation of the data to be operated, a corresponding memory address may be calculated according to the size of a parameter (including the kernel parameter) required by each layer, and a memory corresponding to the memory address is pre-allocated into the computation graph, so as to store the corresponding constant data. For example, the size height×width×64 of Featuremap block data and the size Cinx height×width×64 of Filter block data are calculated, so as to facilitate data pre-fetching.

According to the hardware environment-based data operation method provided in the embodiment of the present disclosure, the step of allocating memories of the corresponding storage spaces to the data to be operated may include:

for a plurality of kernel parameters required for performing the convolution computation on the data to be operated, allocating the memories with continuous addresses of the corresponding storage spaces, so as to realize the storage of each kernel parameter.

It should be noted that, it is necessary to acquire each kernel parameter in sequence when each kernel parameter among the plurality of kernel parameters is used for performing the convolution computation with the data to be operated, therefore when the corresponding memory is allocated to each kernel parameter in the present disclosure, the memories with the continuous addresses may be allocated to the kernel parameter, and the storage of each kernel parameter is realized by using the allocated memories with the continuous addresses. Therefore, when the kernel parameters are acquired, the kernel parameters are only sequentially acquired from this continuous part of memories, so that the acquisition speed of the kernel parameters may be improved, and the data operation efficiency is further improved.

The hardware environment-based data operation method provided in the embodiment of the present disclosure may further include:

after each operation on the data to be operated is completed, setting a corresponding flag bit in a specified register, so as to determine, on the basis of the flag bit, an operation that needs to be performed on the data to be operated.

It should be noted that, the register may be preset, so that after each operation (including convolution computation, activation, pooling, residual and the like) of the data to be operated is implemented, the corresponding flag bit is set in the register, and then, when the data operation needs to be implemented, the flag bit is queried in the register to determine the just completed data operation is which operation, so as to determine the next operation that needs to be implemented and to implement the next operation, thereby effectively ensuring that the operation of the data to be operated is correctly implemented.

According to the hardware environment-based data operation method provided in the embodiment of the present disclosure, the step of performing the convolution computation and the preset computation on the data to be operated may include:

implementing the convolution computation and the preset computation on the data to be operated by means of scheduling threads respectively corresponding to each operation.

It should be noted that, in order to directly call a corresponding thread to implement a corresponding operation when each operation is implemented, there is no need to wait. In the embodiment of the present disclosure, a corresponding thread may be set for each operation, for example, corresponding threads are set for convolution computation, activation, pooling and residual, respectively, so that corresponding operations are respectively implemented by using the four threads, and thus the data operation speed is further improved.

Figure 8:
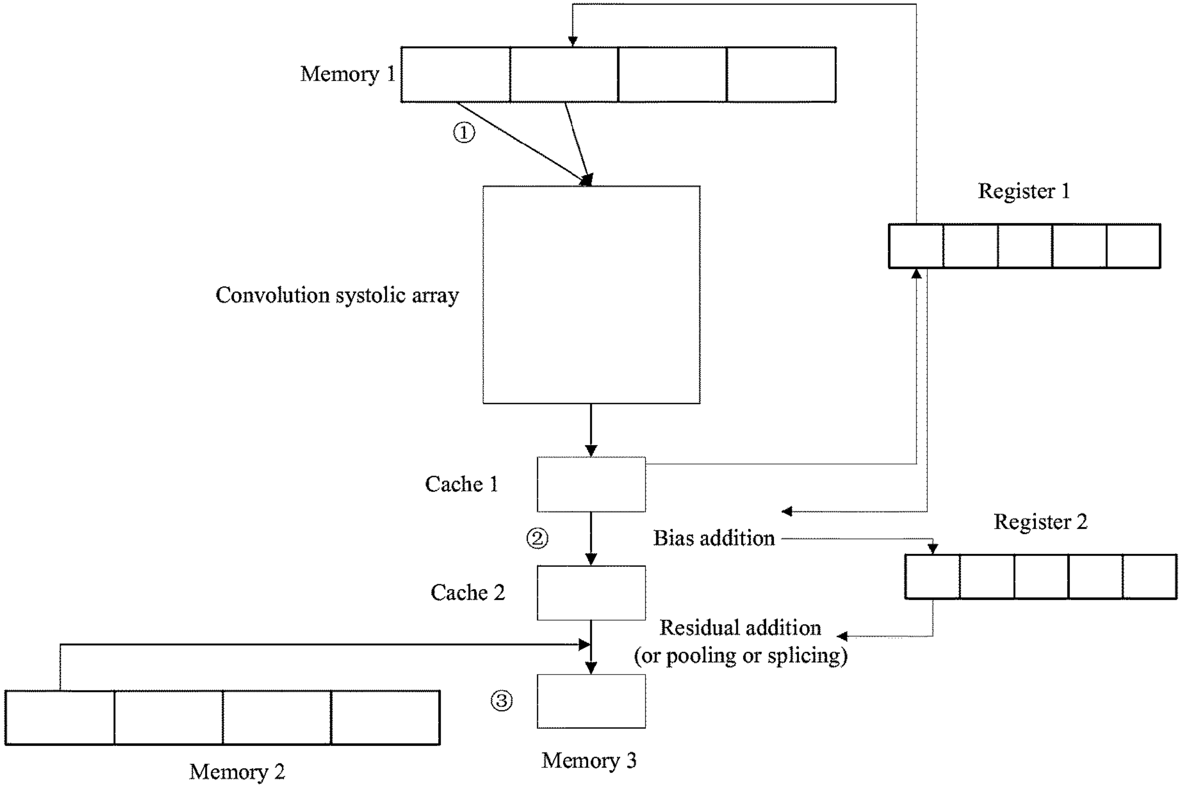
FIG. 8 is an example diagram of thread scheduling in a hardware environment-based data operation method provided in an embodiment of the present disclosure.

In an application scenario, when scheduling optimization corresponding to the hardware environment-based data operation method provided in the embodiment of the present disclosure is executed on hardware, memory, cache and thread scheduling are involved, as shown in FIG. 8, which may be as follows:

(1) a thread ① is used for executing the convolution computation: continuously transmitting the featuremap data in a memory MEM 1 to the convolution systolic array, after the convolution computation of the first block of data is completed, writing the data into a cache Cache1, setting the flag bit of a register Register1, and then executing the convolution computation of the second block of data according to the flag bit;

(2) executing a thread ② according to the flag bit of the register Register1, reading the data in the cache Cache1, executing bias addition computation and activation computation, writing the data into a cache Cache2 after the bias addition computation and the activation computation are executed, and setting the flag bit of a register Register2; and (3) executing a thread ① according to the flag bit of the register Register1, reading the data in the cache Cache2 and a memory MEM2, executing residual addition computation, and writing the data into a memory MEM3 after the residual addition computation is executed.

As described above, the thread ① is used for executing the convolution computation, the thread ② and the thread ③ may be newly established after the thread ① executes the corresponding convolution computation every time, and other settings may also be performed according to actual needs.

In summary, in order to improve the data operation efficiency, the present disclosure includes the following optimizations:

(1) operator fusion: the operators are divided into channel-relevant and channel-irrelevant operators, the channel-irrelevant operators are fused to the output part of the channel-relevant operators, that is, a plurality of small operators are fused together, thereby reducing the memory access of the intermediate tensor;

(2) data layout transformations: the resources of the convolution systolic array are maximally utilized to divide the data into a plurality of blocks, each block has 64 output channels, the block, which is less than 64 channels, is supplemented with 0, the computation between the blocks is irrelevant, that is, internal data layout is converted into a rear-end friendly form;

(3) static memory planning: the size of the intermediate tensor is calculated in advance, and the corresponding memory address is planned, so as to reduce the delay in the data access of the hardware end; and the address of the constant data is calculated in advance during convolutional neural network reasoning, and the planned constant data is written into the memory, so as to reduce the delay in the data access of the hardware end; and (4) scheduling optimization: the fusion operation, layout transformation and memory planning for optimizing the computation graph are implemented on hardware, which relates to memory, cache and thread scheduling, implements the simultaneous operation of multi-thread and multi-operator of the data blocks, and ensures the pipelined execution of the data computation.

Therefore, in the present disclosure, the present disclosure implements the accelerated reasoning of the convolutional neural network for computation resources of a hardware environment (such as dsp of VU37P), so that the 64 output channels are parallel, and the convolution systolic array resources are maximally utilized; the convolution computation is split and analyzed on the output channels, so that the data may be divided into a plurality of blocks according to the 64 output channels, so as to independently participate in computation, and some channel-irrelevant operations in the convolutional neural network are fused by using the irrelevance between the output data blocks during the convolution computation, thereby reducing the bandwidth pressure caused by frequent access of the memory of the intermediate tensor, therefore the operation of each block after the convolution computation is executed and the convolution computation of other blocks are performed in parallel, thereby realizing uninterrupted pipelined operation of the data. In conclusion, the present disclosure may make full use of all computation resources provided by an FPGA hardware platform, realize efficient pipelined operations, improve the system throughput, improve the execution reasoning speed of the convolutional neural network, and reduce the energy consumption.

Figure 9:
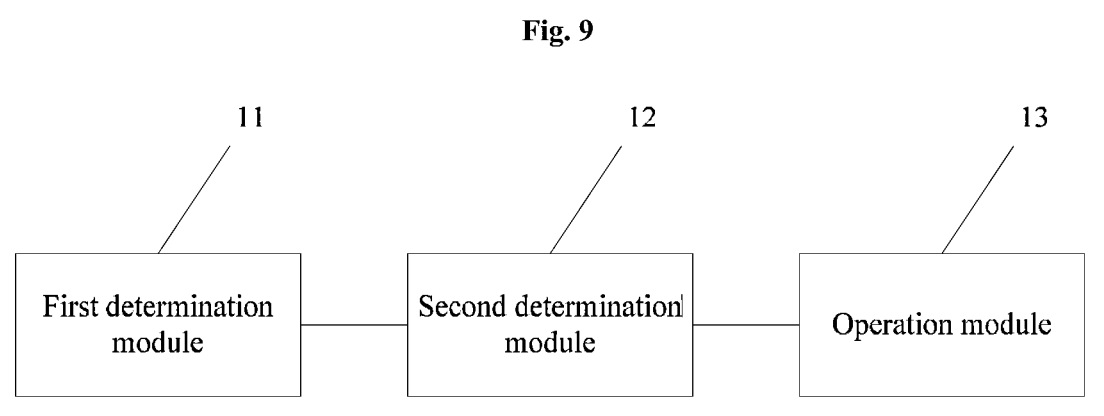

An embodiment of the present disclosure further provides a hardware environment-based data operation apparatus. As shown in FIG. 9, the hardware environment-based data operation apparatus may include:

a first determination module 11, configured to determine data to be operated and target hardware, wherein the target hardware is a hardware resource that needs to perform convolution computation on the data to be operated currently;

a second determination module 12, configured to determine the maximum number of channels in which the target hardware executes parallel computation, and determine a data layout corresponding to the maximum number of channels to be an optimal data layout; and an operation module 13, configured to convert the data layout of the data to be operated into the optimal data layout, and perform the convolution computation on the data to be operated by using the target hardware after the conversion is completed.

According to the hardware environment-based data operation apparatus provided in the embodiment of the present disclosure, the operation module may include:

a computation unit, configured to acquire a plurality of kernel parameters, and sequentially perform the convolution computation on the data to be operated and each kernel parameter by using the target hardware; and correspondingly, the computation unit is further configured to: while performing the convolution computation on other kernel parameters except the first kernel parameter and the data to be operated by using the target hardware, perform preset channel-irrelevant computation on a convolution computation result corresponding to the previous kernel parameter on which the convolution computation is performed.

According to the hardware environment-based data operation apparatus provided in the embodiment of the present disclosure, the computation unit may include:

a computation sub-unit, configured to sequentially perform the convolution computation and the preset computation on the data to be operated with any kernel parameter according to a preset operator, and store a result obtained after performing the preset computation, wherein the preset operator is obtained by fusing an operator of the convolution computation with an operator of the preset computation.

The hardware environment-based data operation apparatus provided in the embodiment of the present disclosure may further include:

an allocation module, configured to predict storage spaces respectively required by tensor data and constant data, which need to be stored during the process of operating the data to be operated, and allocate memories of the corresponding storage spaces to the data to be operated, so as to realize corresponding data storage, wherein the operation includes the convolution computation and the preset computation.

According to the hardware environment-based data operation apparatus provided in the embodiment of the present disclosure, the allocation module may include:

an allocation module configured to, for a plurality of kernel parameters required for performing the convolution computation on the data to be operated, allocate the memories with continuous addresses of the corresponding storage spaces, so as to realize the storage of each kernel parameter.

According to the hardware environment-based data operation apparatus provided in the embodiment of the present disclosure, the computation unit may include:

a scheduling sub-unit, configured to implement the convolution computation and the preset computation on the data to be operated by means of scheduling threads respectively corresponding to each operation.

The hardware environment-based data operation apparatus provided in the embodiment of the present disclosure may further include:

a marking module configured to: after each operation on the data to be operated is completed, set a corresponding flag bit in a specified register, so as to determine, on the basis of the flag bit, an operation that needs to be performed on the data to be operated.

An embodiment of the present disclosure further provides a hardware environment-based data operation device, which may include:

a memory, configured to store a computer program; and at least one processor, configured to implement the operations of any one of the foregoing hardware environment-based data operation method when executing the computer program.

An embodiment of the present disclosure further provides a computer-readable storage medium, wherein a computer program is stored on the computer-readable storage medium, and when executed by at least one processor, the computer program implements the operations of any one of the foregoing hardware environment-based data operation method.

It should be noted that, for the description of related parts in the hardware environment-based data operation apparatus and device, and the storage medium provided in the embodiments of the present disclosure, reference is made to the detailed description of corresponding parts in the hardware environment-based data operation method provided in the embodiments of the present disclosure, and thus details are not described herein again. In addition, in the above technical solutions provided in the embodiments of the present disclosure, parts consistent with the implementation principles of corresponding technical solutions in the prior art are not described in detail, so as to avoid excessive repeated descriptions.

The foregoing description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments shown herein, but conforms to the widest scope consistent with the principles and novel features disclosed herein.

What is claimed is:

1. A hardware environment-based data operation method, comprising:

determining data to be operated and target hardware, wherein the target hardware is a hardware resource that needs to perform convolution computation on the data to be operated currently;

determining the maximum number of channels in which the target hardware executes parallel computation, and determining a data layout corresponding to the maximum number of channels to be an optimal data layout; and converting the data layout of the data to be operated into the optimal data layout, and performing the convolution computation on the data to be operated by using the target hardware after the conversion is completed;

wherein performing the convolution computation on the data to be operated by using the target hardware comprises: acquiring a plurality of kernel parameters, and sequentially performing the convolution computation on the data to be operated and each kernel parameter by using the target hardware;

wherein the method further comprises: while performing the convolution computation on other kernel parameters except the first kernel parameter and the data to be operated by using the target hardware, performing preset channel-irrelevant computation on a convolution computation result corresponding to the previous kernel parameter on which the convolution computation is performed.

2. The method according to claim 1, wherein sequentially performing the convolution computation and the preset computation on the data to be operated with any kernel parameter comprises:

sequentially performing the convolution computation and the preset computation on the data to be operated with any kernel parameter according to a preset operator, and storing a result obtained after performing the preset computation, wherein the preset operator is obtained by fusing an operator of the convolution computation with an operator of the preset computation.

3. The method according to claim 2, wherein before performing the convolution computation and the preset computation on the data to be operated, the method further comprises:

predicting storage spaces respectively required by tensor data and constant data, which need to be stored during the process of operating the data to be operated, and allocating memories of the corresponding storage spaces to the data to be operated, so as to realize corresponding data storage, wherein the operation comprises the convolution computation and the preset computation.

4. The method according to claim 3, wherein allocating memories of the corresponding storage spaces to the data to be operated comprises:

for a plurality of kernel parameters required for performing the convolution computation on the data to be operated, allocating the memories with continuous addresses of the corresponding storage spaces, so as to realize the storage of each kernel parameter.

5. The method according to claim 4, wherein performing the convolution computation and the preset computation on the data to be operated comprises:

implementing the convolution computation and the preset computation on the data to be operated by means of scheduling threads respectively corresponding to each operation.

6. The method according to claim 5, further comprising:

after each operation on the data to be operated is completed, setting a corresponding flag bit in a specified register, so as to determine, on the basis of the flag bit, an operation that needs to be performed on the data to be operated.

7. The method according to claim 1, wherein the data to be operated refer to at least one of the followings: data that is not subjected to any convolution computation and thus requires convolution computation, data that is subjected to corresponding convolution computation and requires the convolution computation again.

8. The method according to claim 1, wherein the convolution computation is performed by at least one convolution layer of a Convolutional Neural Network (CNN), the CNN is implemented on the basis of one of the following: an Field-Programmable Gate Array (FPGA), a Graphics Processing Unit (GPU), an Application Specific Integrated Circuit (ASIC).

9. The method according to claim 1, wherein a data layout is storage form of a given tensor in a computed graph.

10. The method according to claim 1, wherein the target hardware is an Field-Programmable Gate Array (FPGA)-based VU37P board card, and the VU37P executes 64-channel parallel computation.

11. The method according to claim 10, wherein the data to be operated is converted into data having a 64-channel data layout according to the hardware resources of the target hardware.

12. The method according to claim 1, wherein before converting the data layout of the data to be operated into the optimal data layout, the method comprises:

determining whether a preferred data layout of a software end matches the optimal data layout, wherein converting the data layout of the data to be operated into the optimal data layout is performed under a condition that the preferred data layout of the software end does not match the optimal data layout.

13. The method according to claim 12, wherein the preferred data layout of the software end is specified for each operator according to constraints specified by a memory hierarchical structure.

14. The method according to claim 1, wherein a convolution array for implementing the convolution computation is a Digital Signal Processor (DSP) array which is constructed by at least one DSP.

15. The method according to claim 1, wherein the channel-irrelevant operators comprise at least one of the followings: an operator of an activation computation, an operator of a pooling computation, an operator of a residual computation.

16. The method according to claim 1, wherein before operating the data to be operated, the method further comprises:

calculating a corresponding memory address according to the size of a parameter required by each layer, and pre-allocating a memory corresponding to the memory address into the computation graph.

17. A hardware environment-based data operation device, comprising:

at least one processor;

a memory, configured to store a computer program, wherein when executed by the at least one processor, the computer program causes the at least one processor to:

determining data to be operated and target hardware, wherein the target hardware is a hardware resource that needs to perform convolution computation on the data to be operated currently;

determining the maximum number of channels in which the target hardware executes parallel computation, and determining a data layout corresponding to the maximum number of channels to be an optimal data layout; and converting the data layout of the data to be operated into the optimal data layout, and performing the convolution computation on the data to be operated by using the target hardware after the conversion is completed;

wherein when executed by the at least one processor, the computer program further causes the at least one processor to: acquire a plurality of kernel parameters, and sequentially perform the convolution computation on the data to be operated and each kernel parameter by using the target hardware; and while performing the convolution computation on other kernel parameters except the first kernel parameter and the data to be operated by using the target hardware, perform preset channel-irrelevant computation on a convolution computation result corresponding to the previous kernel parameter on which the convolution computation is performed.

18. A non-transitory computer-readable storage medium, storing a computer program, wherein when executed by at least one processor, the computer program causes the at least one processor to:

determining data to be operated and target hardware, wherein the target hardware is a hardware resource that needs to perform convolution computation on the data to be operated currently;

determining the maximum number of channels in which the target hardware executes parallel computation, and determining a data layout corresponding to the maximum number of channels to be an optimal data layout; and converting the data layout of the data to be operated into the optimal data layout, and performing the convolution computation on the data to be operated by using the target hardware after the conversion is completed;

wherein when executed by the at least one processor, the computer program further causes the at least one processor to acquire a plurality of kernel parameters, and sequentially perform the convolution computation on the data to be operated and each kernel parameter by using the target hardware; and while performing the convolution computation on other kernel parameters except the first kernel parameter and the data to be operated by using the target hardware, perform preset channel-irrelevant computation on a convolution computation result corresponding to the previous kernel parameter on which the convolution computation is performed.

* * * * *